United States Patent
You et al.

(10) Patent No.: US 9,570,232 B2
(45) Date of Patent: Feb. 14, 2017

(54) TRANSFORMER FOR POWER LINE COMMUNICATION

(71) Applicant: LSIS CO., LTD., Anyang-si, Gyeonggi-do (KR)

(72) Inventors: Chang Sung You, Seoul (KR); Seong Joon Lee, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 139 days.

(21) Appl. No.: 14/512,015

(22) Filed: Oct. 10, 2014

(65) Prior Publication Data

US 2015/0123644 A1    May 7, 2015

(30) Foreign Application Priority Data

Nov. 4, 2013   (KR) .................. 10-2013-0132886
Nov. 4, 2013   (KR) .................. 10-2013-0132890

(51) Int. Cl.
    *H04B 3/56*      (2006.01)
    *H01F 38/14*     (2006.01)
    *H04B 3/54*      (2006.01)

(52) U.S. Cl.
    CPC ............. *H01F 38/14* (2013.01); *H04B 3/54* (2013.01); *H04B 3/56* (2013.01); *H04B 2203/5491* (2013.01)

(58) Field of Classification Search
    CPC ..... H04B 3/54; H04B 3/56; H04B 2203/5491; H01F 38/14
    See application file for complete search history.

(56) References Cited

U.S. PATENT DOCUMENTS

| | | | |
|---|---|---|---|
| 8,639,922 B2* | 1/2014 | Phatak | G06F 21/34 713/156 |
| 8,823,546 B2* | 9/2014 | Myoung | H04Q 9/00 340/870.02 |
| 2004/0135676 A1 | 7/2004 | Berkman et al. | |
| 2009/0091429 A1* | 4/2009 | Myoung | H04B 3/54 375/258 |
| 2012/0313764 A1* | 12/2012 | Weiss | H04B 3/56 340/12.32 |

FOREIGN PATENT DOCUMENTS

| | | |
|---|---|---|
| EP | 1603249 | 12/2005 |
| WO | 2012/005492 | 1/2012 |

OTHER PUBLICATIONS

European Patent Office Application Serial No. 14188391.8, Search Report dated Mar. 12, 2015, 6 pages.

* cited by examiner

*Primary Examiner* — Matthew Nguyen
(74) *Attorney, Agent, or Firm* — Lee, Hong, Degerman, Kang & Waimey

(57) ABSTRACT

Disclosed is a transformer for power line communication, capable of performing power line communication without being influenced by voltage attenuation due to voltage conversion. The transformer for power line communication includes: a transforming unit configured to convert a high primary voltage into a low secondary voltage, or convert a low secondary voltage into a high primary voltage; a separation unit configured to separate a data signal from a primary voltage input thereto; and a coupling unit configured to couple the data signal with the low secondary voltage.

11 Claims, 3 Drawing Sheets

TRANSFORMER FOR POWER LINE COMMUNICATION

CROSS-REFERENCE TO RELATED APPLICATION

Pursuant to 35 U.S.C. §119(a), this application claims the benefit of earlier filing date and right of priority to Korean Application Nos. 10-2013-0132886 and 10-2013-0132890, both filed on Nov. 4, 2013, the contents of which are incorporated by reference herein in their entirety.

BACKGROUND OF THE DISCLOSURE

1. Field of the Disclosure

This disclosure relates to power line communication, and more particularly, to a transformer for power line communication.

2. Background of the Disclosure

Generally, power line communication (abbreviated as PLC hereinafter) means a communication method using a power line for supplying electric power as a communication medium.

A power line signal is attenuated by about 40 dB while passing through a transformer disposed on an electric power pole. This may cause a difficulty in using power line communication at a front end of the transformer and a rear end of the transformer.

FIG. 1 is a block diagram illustrating a configuration of a transformer for power line communication in accordance with the conventional art.

Once a high primary voltage is applied to the transformer 100, the high primary voltage is converted into a low secondary voltage by a transforming unit 110. Then the low secondary voltage is applied to a PLC module 120, so that data can be extracted from the secondary voltage.

However, as aforementioned, voltage attenuation by about 40 dB occurs while a voltage is converted by the transforming unit 110. This may cause data attenuation, resulting in a difficulty in performing communication.

In an automatic meter reading (abbreviated as AMR hereinafter) system using power line communication, a data concentration unit (abbreviated as DCU hereinafter) is additionally mounted to a lower end of the transformer. This may require an additional communication line for main line communication between the DCU and the transformer. Thus, the fabrication cost may be increased.

SUMMARY OF THE DISCLOSURE

Therefore, an object of the invention is to provide a transformer for power line communication, capable of performing power line communication without being influenced by voltage attenuation due to voltage conversion.

Another object of the invention is to provide a transformer having therein a DCU, capable of requiring no additional cable between the transformer and the DCU.

To achieve these and other advantages and in accordance with the object of this disclosure, there is provided a transformer for power line communication, comprising:

a transforming unit configured to convert a high primary voltage into a low secondary voltage, or convert a low secondary voltage into a high primary voltage;

a separation unit configured to separate a data signal from a primary voltage input thereto; and a coupling unit configured to couple the data signal with the low secondary voltage.

To achieve the other object of this disclosure, there is provided a transformer for power line communication, comprising:

a transforming unit configured to convert a high primary voltage into a low secondary voltage, or convert a low secondary voltage into a high primary voltage;

a separation unit configured to separate a data signal from a primary voltage input thereto;

a coupling unit configured to couple the data signal with the low secondary voltage;

a first modem configured to receive the data signal from the separation unit, and to transmit the data signal via main line communication; and a second modem configured to receive meter-reading data via communication, and to provide the meter-reading data to the coupling unit.

According to one aspect of the present invention, the transformer for power line communication may further a first filter configured to filter an electric signal from a primary voltage input thereto, and to provide only the electric signal to the transforming unit.

According to another aspect of the present invention, the transformer for power line communication may further comprise an amplifying unit configured to amplify a data signal separated by the separation unit.

According to still another aspect of the present invention, the separation unit may be configured as a high voltage analogue front end.

According to still another aspect of the present invention, the coupling unit may be configured as a low voltage analogue front end.

According to still another aspect of the present invention, the transformer for power line communication may further include a second filter configured to filter a combined signal of the data provided from the coupling unit and the secondary voltage, and to output the combined signal to the transforming unit.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this disclosure, illustrate exemplary embodiments and together with the description serve to explain the principles of the disclosure.

In the drawings.

DETAILED DESCRIPTION OF THE DISCLOSURE

Description will now be given in detail of preferred configurations of mobile terminals according to the present invention, with reference to the accompanying drawings.

A preferred embodiment of the present invention will be explained in more detail with reference to the attached drawings.

Figure 1:
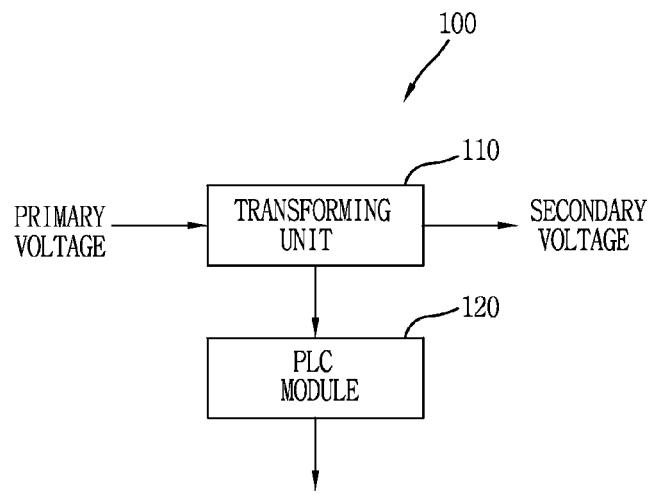
FIG. 1 is a block diagram illustrating a configuration of a transformer for power line communication in accordance with the conventional art.
Figure 2:
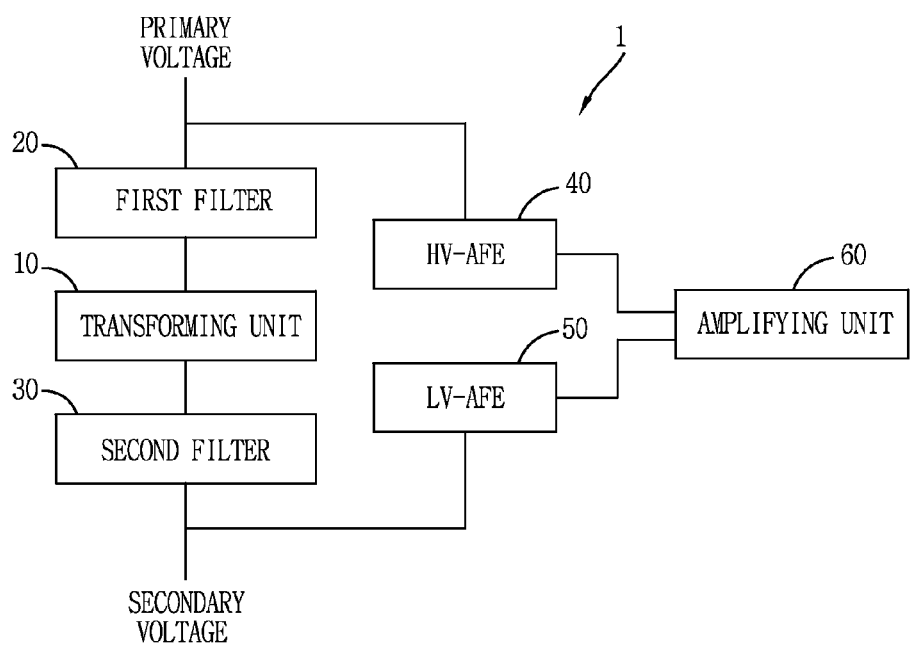
FIG. 2 is a block diagram illustrating a configuration of a transformer for power line communication according to an embodiment of the present invention.

FIG. 2 is a block diagram illustrating a configuration of a transformer for power line communication according to an embodiment of the present invention.

As shown, the transformer 1 for power line communication according to an embodiment of the present invention comprises a transforming unit 10, a first filter 20, a second filter 30, a high voltage-analog front end (abbreviated as HV-AFE hereinafter) 40, a low voltage-analog front end (abbreviated as LV-AFE hereinafter) 50 and an amplifying unit 60.

The first filter 20 is configured to filter data from an input primary voltage, and to provide only an electric power component to the transforming unit 10.

The transforming unit 10 may convert a high primary voltage into a low secondary voltage.

The second filter 30 may re-filter the secondary voltage having passed through the transforming unit 10, thereby outputting a final secondary voltage.

The transforming unit 10 may convert a high primary voltage into a low secondary voltage, or may convert a low secondary voltage into a high primary voltage.

The HV-AFE 40, a separation unit, is connected to a high voltage line, thereby interrupting a line voltage supplied from the high voltage line and extracting only data.

The LV-AFE 50, a coupling unit, is connected to a low voltage line, thereby coupling a line voltage with data.

The amplifying unit 60 is configured to amplify data signal extracted from the HV-AFE 40.

Once a signal for power line communication is applied to the transformer 1, a high primary voltage is filtered by the first filter 20. Thus, only an electric signal is converted into a low secondary voltage by the transforming unit 10. Data of the high primary voltage may be separated from a line voltage through the HV-AFE 40, so that only a base band signal can be amplified by the amplifying unit 60.

A data signal applied from the amplifying unit 60 may be coupled to a low line voltage through the LV-AFE 50. Then the data signal may be converted into a high primary voltage through the transforming unit 10, and may be applied to an external power line.

In the present invention, a communication signal applied to the transformer 1 does not directly pass through the transforming unit 10. This can allow a transformer signal to be transmitted without attenuation of power line communication signal.

A transformer for power line communication according to another embodiment of the present invention will be explained with reference to FIG. 3.

Figure 3:
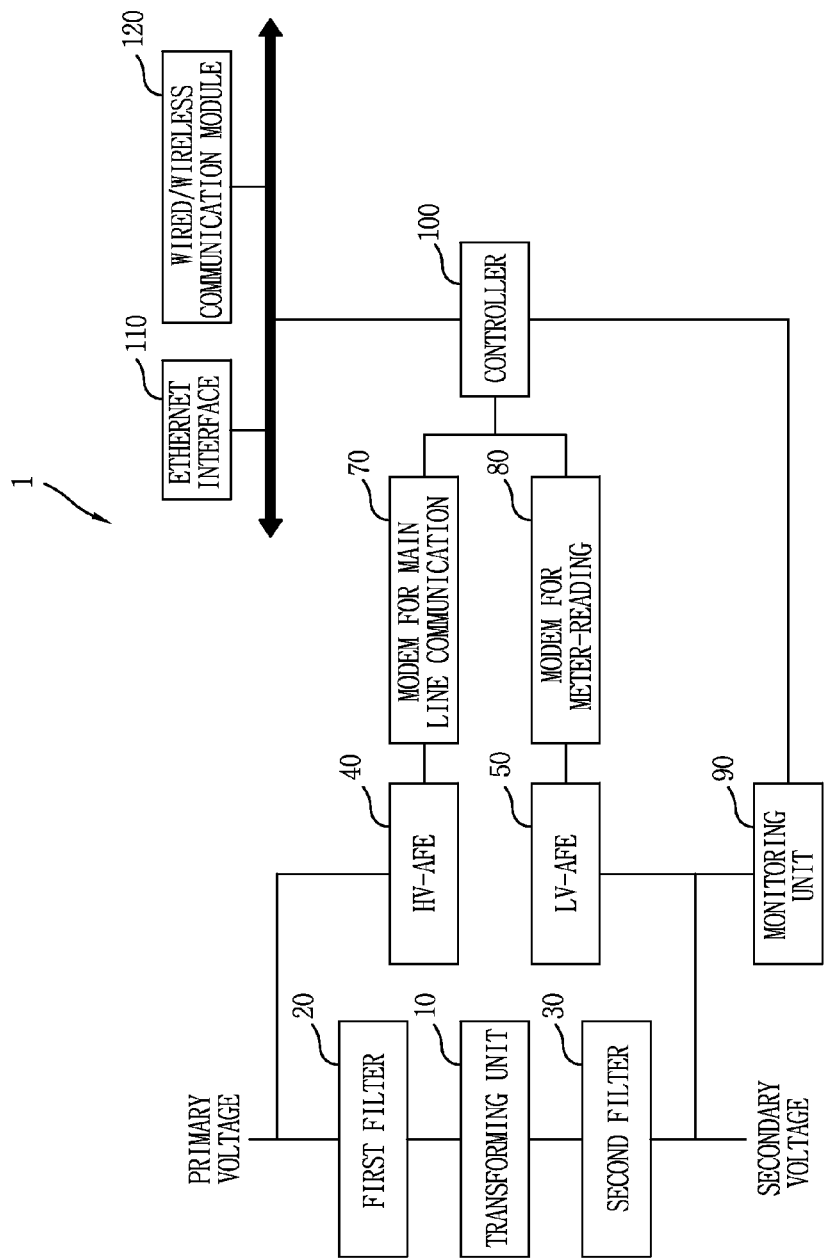
FIG. 3 is a block diagram illustrating a configuration of a transformer for power line communication according to another embodiment of the present invention.

As shown in FIG. 3, the transformer 1 for power line communication according to another embodiment of the present invention includes a first filter 20, a second filter 30, a high voltage-analog front end (abbreviated as HV-AFE hereinafter) 40, a low voltage-analog front end (abbreviated as LV-AFE hereinafter) 50, a modem for main line communication 70, a modem for meter-reading 80, a monitoring unit 90, a controller 100, an Ethernet interface 110 and a wired and wireless communication module 120. The modem for main line communication 70, the modem for meter-reading 80, the monitoring unit 90, the controller 100, the Ethernet interface 110 and the wired and wireless communication module 120 are components for performing a DCU function.

The first filter 20 is configured to filter data from an input primary voltage, and to provide only an electric power component to the transforming unit 10. The transforming unit 10 may convert a high primary voltage into a low secondary voltage.

The second filter 30 may re-filter the secondary voltage having passed through the transforming unit 10, thereby outputting a final secondary voltage.

The transforming unit 10 may convert a high primary voltage into a low secondary voltage, or may convert a low secondary voltage into a high primary voltage.

The HV-AFE 40 is connected to a high voltage line, thereby interrupting a line voltage supplied from the high voltage line and extracting only data. The LV-AFE 50 is connected to a low voltage line, thereby coupling a line voltage with data.

The monitoring unit 90 may be configured to monitor the transformer 1 under control of the controller 90.

The modem for main line communication (70) may receive data from the HV-AFE 40, and then may transmit the data to the controller 100. The controller 100 may transmit data to the modem for meter-reading 80 through power line communication, and may couple the data with a secondary voltage through the LV-AFE 50.

Once a signal for power line communication is applied to the transformer 1, a high primary voltage is filtered by the first filter 20. Thus, only an electric signal is converted into a low secondary voltage by the transforming unit 10. Data of the high primary voltage may be separated from a line voltage through the HV-AFE 40, so that only a base band signal can be applied to the modem for main line communication (70).

A data signal applied to the modem for meter-reading 80 by the controller 100 may be coupled to a low line voltage through the LV-AFE 50. Then the data signal may be converted into a high primary voltage through the transforming unit 10, and may be applied to the external power line.

The controller 100 may be connected to the Ethernet interface 110 and the wired and wireless communication module 120 through a peripheral device bus, thereby transmitting and receiving data.

In the present invention, a communication signal applied to the transformer 1 does not directly pass through the transforming unit 10. This can allow a transformer signal to be transmitted without attenuation of power line communication signal. Further, data for automatic meter reading (can be abbreviated as AMR) is directly transceived (transmitted and received) in the transformer. Thus, a cable between the transformer and a DCU is not required, and hardware can be reduced.

A configuration of power line communication system including the transformer for power line communication according to the present invention will be explained with reference to FIG. 4.

Figure 4:
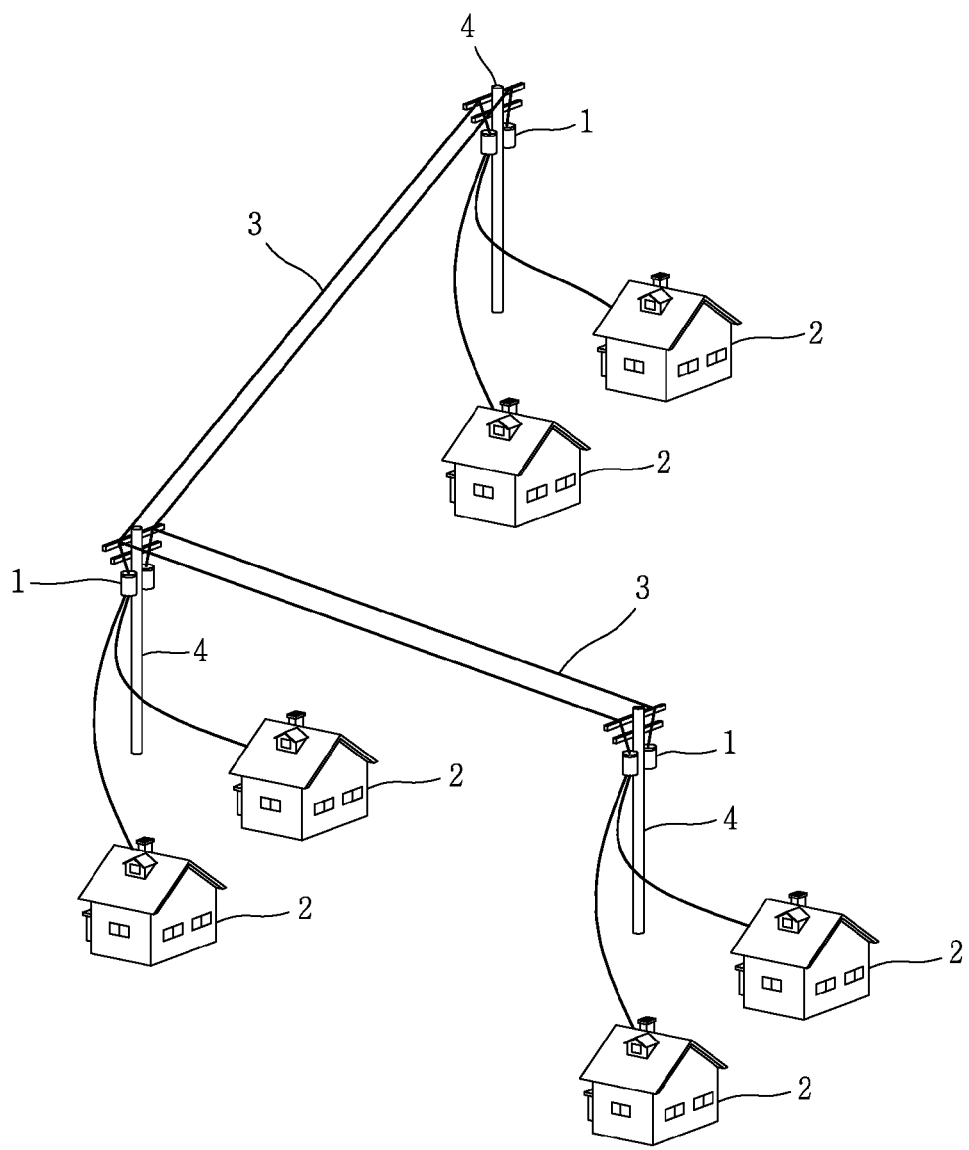
FIG. 4 is a block diagram illustrating a configuration of power line communication system including a transformer for power line communication according to the present invention.

As shown in FIG. 4, the transformers 1 are disposed on power poles 4 connected to each other by power lines 3, and are connected to power consumption places (homes) distant therefrom by several meters. In this case, hardware installed on the power poles 4 is merely the transformers 1. Since the transformer 1 is provided therein with a DCU, waste of hardware can be reduced.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A transformer for power line communication, the transformer configured to receive an input voltage comprising an electrical power signal and a data signal and comprising:
    a transforming unit configured to convert a high primary voltage to a low secondary voltage;
    a separation unit configured to separate the data signal from the high primary voltage;
    a coupling unit configured to couple the data signal with the low secondary voltage;
    a first filter configured to filter the data signal from the high primary voltage and to provide only the electrical power signal to the transforming unit; and
    a second filter configured to filter the data signal and the low secondary voltage received from the coupling unit and to output the combined signal to the transforming unit.

2. The transformer of claim 1, further comprising an amplifying unit configured to amplify the data signal separated by the separation unit.

3. The transformer of claim 1, wherein the separation unit is a high voltage analog front end.

4. The transformer of claim 1, wherein the coupling unit is a low voltage analog front end.

5. A transformer for power line communication, the transformer configured to receive an input voltage comprising an electrical power signal and a data signal and comprising:
    a transforming unit configured to convert a high primary voltage to a low secondary voltage;
    a separation unit configured to separate the data signal from the high primary voltage;
    a coupling unit configured to couple the data signal with the low secondary voltage;
    a first filter configured to filter the data signal from the high primary voltage and to provide only the electrical power signal to the transforming unit; and
    a second filter configured to filter the data signal and the low secondary voltage received from the coupling unit and to output the combined signal to the transforming unit;
    a first modem configured to receive the data signal from the separation unit and to transmit the data signal via main line communication; and
    a second modem configured to receive meter-reading data via communication and to provide the meter-reading data to the coupling unit.

6. The transformer of claim 5, further comprising a controller configured to control the first modem and the second modem via an external bus.

7. The transformer of claim 5, further comprising an amplifying unit configured to amplify the data signal separated by the separation unit.

8. The transformer of claim 5, wherein the separation unit is a high voltage analog front end.

9. The transformer of claim 5, wherein the coupling unit is a low voltage analog front end.

10. The transformer of claim 1, further comprising:
    a first modem configured to receive the data signal from the separation unit and to transmit the data signal via main line communication; and
    a second modem configured to receive meter-reading data via communication and to provide the meter-reading data to the coupling unit.

11. The transformer of claim 10, further comprising a controller configured to control the first modem and the second modem via an external bus.

* * * * *